United States Patent
Boufounos

(10) Patent No.: US 9,244,158 B2
(45) Date of Patent: Jan. 26, 2016

(54) DEPTH SENSING USING ACTIVE COHERENT SIGNALS

(75) Inventor: Petros T. Boufounos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 882 days.

(21) Appl. No.: 13/405,504

(22) Filed: Feb. 27, 2012

(65) Prior Publication Data

US 2013/0226509 A1 Aug. 29, 2013

(51) Int. Cl.
| | |
|---|---|
| *G01C 9/00* | (2006.01) |
| *G01S 7/295* | (2006.01) |
| *G01S 17/89* | (2006.01) |
| *G01S 7/486* | (2006.01) |
| *G01S 13/89* | (2006.01) |
| G01S 15/89 | (2006.01) |
| G01C 3/08 | (2006.01) |
| G01S 15/00 | (2006.01) |

(52) U.S. Cl.
CPC .............. *G01S 7/295* (2013.01); *G01S 7/486* (2013.01); *G01S 13/89* (2013.01); *G01S 17/89* (2013.01); *G01C 3/08* (2013.01); *G01S 15/003* (2013.01); *G01S 15/89* (2013.01)

(58) Field of Classification Search
CPC ............. G01C 3/08; G01S 13/89; G01S 7/48; G01S 15/89; G01S 15/876; G01S 7/54; G01S 15/003; G01S 17/89; G01S 7/486; G06K 9/6249
USPC .......................................... 709/150; 702/150
See application file for complete search history.

(56) References Cited

U.S. PATENT DOCUMENTS

| | | | | | |
|---|---|---|---|---|---|
| 4,059,759 | A | * | 11/1977 | Harney et al. ................ | 250/206 |
| 4,816,833 | A | * | 3/1989 | Ferguson et al. ............... | 342/95 |
| 5,038,150 | A | * | 8/1991 | Bains ............................ | 342/373 |
| 5,134,884 | A | * | 8/1992 | Anderson ...................... | 73/625 |
| 5,278,757 | A | * | 1/1994 | Hoctor et al. ................. | 600/459 |
| 5,557,283 | A | * | 9/1996 | Sheen ................... | G01V 8/005 |
| | | | | | 342/179 |
| 5,734,736 | A | * | 3/1998 | Palmer et al. ................. | 382/103 |
| 5,986,815 | A | * | 11/1999 | Bryars .......................... | 359/634 |
| 5,988,829 | A | * | 11/1999 | Holder ......................... | 362/223 |
| 2006/0116579 | A1 | * | 6/2006 | Li et al. ........................ | 600/444 |
| 2006/0239523 | A1 | * | 10/2006 | Stewart et al. ............... | 382/128 |
| 2007/0154221 | A1 | * | 7/2007 | McNicol et al. ............. | 398/135 |
| 2007/0258706 | A1 | * | 11/2007 | Raskar et al. .................. | 396/52 |
| 2009/0185358 | A1 | * | 7/2009 | Liu et al. ........................ | 362/3 |
| 2010/0315833 | A1 | * | 12/2010 | Holman et al. ............... | 362/607 |
| 2012/0111119 | A1 | * | 5/2012 | Small et al. .................... | 73/633 |
| 2012/0308099 | A1 | * | 12/2012 | Benson et al. ................ | 382/131 |
| 2013/0088726 | A1 | * | 4/2013 | Goyal et al. .................. | 356/634 |
| 2013/0116561 | A1 | * | 5/2013 | Rothberg et al. ............. | 600/438 |
| 2013/0194130 | A1 | * | 8/2013 | Abatzoglou et al. .......... | 342/159 |

OTHER PUBLICATIONS

Boufounos et al., Compressive sampling for streaming signals with sparse frequency content, Mar. 2010, IEEE, pp. 1-6.*

* cited by examiner

*Primary Examiner* — John Breene
*Assistant Examiner* — Eyob Hagos
(74) *Attorney, Agent, or Firm* — Dirk Brinkman; Gene Vinokur

(57) ABSTRACT

Reflectors in a scene are reconstructed using reflected signals. First, signals are transmitted to the scene, and the reflected signals are received by receivers are arranged in an array. The reflected signals are then processed to reconstruct the reflectors in the scene, wherein the processing enforces a model that a reflectivity of the scene in front and behind any reflector is equal to zero.

14 Claims, 7 Drawing Sheets

150

Algorithm 1 The modified model-based CoSaMP algorithm to enforce the model described in this paper.

1: initialize iteration count $l = 0$, initial estimate $\tilde{x}^l = 0$.
2: while not converged do
3:   Increase iteration count: $l \leftarrow l + 1$
4:   Compute residual:
$$R(\omega) = Y(\omega) - A(\omega)\tilde{x}^{l-1}, \text{ for all } \omega$$
5:   Compute proxy (gradient): $p^l = \sum_\omega A^H(\omega)R(\omega)$
6:   Identify support candidate:
$$\mathcal{T}^l = \text{supp}\left(\text{trunc}(p^l, K)\right) \cup \text{supp}\left(\tilde{x}^{l-1}\right)$$
   {supp($\cdot$) determines the support set of a vector; trunc($x, K$) selects the $K$ coefficients of $x$ according to our model and sets the remaining to zero, as described in Algorithm 2}
7:   Line search: Find $\tau$ to minimize
$$\sum_\omega \left\| Y(\omega) - A(\omega)\left(\tilde{x}^{l-1} - \tau p^l|_{\mathcal{T}^l}\right) \right\|_2^2, \text{ s.t. } x|_{\mathcal{T}^{lc}} = 0$$
8:   Form temporary estimate:
$$b^l = \left(\tilde{x}^{l-1} - \tau p^l\right)\big|_{\mathcal{T}^l}$$
9:   Compute final support: $\mathcal{S}^l = \text{trunc}(b^l, K)$
10:  Truncate and update estimate: $\tilde{x}^l = b^l|_{\mathcal{S}^l}$
11: end while
12: return Signal estimate $\tilde{x}^l$

Fig. 4

Algorithm 2 The truncation operator trunc($x$, $K$).

Input: Data $x$ and desired sparsity $K$.

1: 
2: Find maximum value along each orientation $\psi$:
$$(u)_\psi = \max_d(x)_{d,\psi}, \quad (l)_\psi = \arg\max_d(x)_{d,\psi}$$
{Vectors $u$ and $l$, indexed in $\psi$ store the maximum values along each orientation and the corresponding distance, respectively}
3: Find the $K$ largest of the maximum values $S = \mathrm{supp}(u|_K)$
{$x|_K$ keeps the $K$ coefficients of $x$ with the largest magnitude and sets the remaining to zero.}
4: Compute index set $T$, containing the support of the $K$ largest values $S$ and the distance of the maximum along the corresponding direction, $l|_S$.
5: return Truncated vector $x|_T$

Fig. 5

DEPTH SENSING USING ACTIVE COHERENT SIGNALS

FIELD OF THE INVENTION

This invention relates generally to sensing depth in a scene, and more particularly to coherently sensing distances of reflectors in the scene.

BACKGROUND OF THE INVENTION

Advances in signal acquisition hardware and software have significantly improved coherent processing of a variety of signal modalities. This enables increasingly accurate distance measurements using technologies such as ultrasonic sensing, and millimeter wave radar. With non-penetrating coherent signals, it is possible to measure and reconstruct the depth in a scene and form a depth map.

Active Sensor Arrays

Typical coherent active arrays include transmitting and receiving components. These, depending on the sensing modality and the available hardware, can be separate physical devices or the same transducer. Each transmitter transmits a pulse, which is reflected from an objects in the scene and received by the receivers. A coherent receiver receives the waveform of the reflected pulse, which is processed to recover the desired information from the scene. This is in contrast to incoherent receivers, such as visible-light sensors, which can only acquire a time-averaged energy of the received signal.

The ability to acquire the reflected waveform allows coherent arrays to measure the time-of-flight of the transmitted pulse from the instance it is transmitted until the reflected pulse is received. It is thus possible to estimate the distance and the position of the reflectors in the scene, i.e., the scene depth.

Specifically, a transmitter s transmits a pulse $p_s(t)$ to the scene. The pulse is reflected by a reflector at distance $d_s$ from the transmitter and received by a receiver at distance $d_r$ from the reflector, delayed by $\tau_{sr}=(d_s+d_r)/c$, where c is the speed of the transmitted signals. Assuming the transmitter and the receiver are omnidirectional, the received signal is $y_r(t)=xp_s(t-\tau_{sr})$, where x is the reflectivity of the reflector.

Often, it is more convenient to express this delay in the frequency domain, i.e., $Y_r(\omega)=xe^{-j\omega\tau_{sr}}P_s(\omega)$, where the uppercase denotes the Fourier transform. The propagation equation is linear, i.e., the principle of superposition can be used to describe the received signal from the transmission of multiple pulses and the reflection from multiple reflectors. Sensor directionality is straightforward to incorporate.

To describe a radar sensing system, the scene is considered in its entirety. The scene is discretized using a grid of N points and represent the reflectivity of each point using $x_n$. The reflectivity is assumed constant as a function of frequency, although it is straightforward to model frequency-dependent reflectivity. Using $\tau_{srn}$ to denote the propagation delay from transmitter s to receiver r through gridpoint n, the propagation equation becomes $$Y_r(\omega) = \sum_n\sum_s x_n e^{-j\omega\tau_{srn}} P_s(\omega). \quad (1)$$

Model-Based Compressive Sensing

Compressive sensing enables significant improvements in the ability to acquire and reconstruct signals at a rate of their complexity rather than a rate of the ambient space in which the signal lies. This is achieved using a signal model. Conventional compressive sensing formulations assume the signal is sparse in some basis. The sparsity model, enforced during reconstruction, resolves the ambiguities in the under-determined system arising from acquiring the signal at a rate lower than the ambient signal dimension.

As used herein, sparse is a well known term of art in signal processing, and not a relative indefinite term. A "sparse" approximation estimates a sparse vector—i.e., a vector with most coefficients equal or approximately equal to zero— satisfying a linear system of equations given high-dimensional observed data and an acquisition matrix.

Signal models other than sparsity can also be used to reduce the sampling requirements and improve the reconstruction performance. Manifolds, group sparsity, joint sparsity, and fusion frame sparsity models are example models. A large number of these models can be described by assuming the signal belongs to a union of subspaces, a more general model with well-known reconstruction processes and recovery conditions. Conventional signal sparsity is also a special case of the union of subspaces model.

Typically, a union of subspaces a is used in recovering a signal from measurements acquired using a linear system $$y=Ax, \quad (2)$$

where A describes the acquisition system, which is usually under-determined. The signal can be recovered, under certain conditions on. A, by determining a vector $\hat{x}$ which belongs in the union of subspaces out of the ones that agree with explain the input signals.

Typical greedy processes, such as model-based Compressive Sampling Matching Pursuit (CoSaMP) and model-based Iterative Hard Thresholding (IHT) generalize their non-model-based counterparts, and attempt to optimize $$\hat{x} = \min_x \| y - Ax \|_2, \text{ such that } x \in S, \quad (3)$$

where S is the space of signals admissible to the model. By replacing S with its convex relaxation, a convex optimization procedure can be used instead of the greedy processes.

Some greedy processes iterate between two basic steps. First, a candidate support for the signal of interest is identified, and second, the system over that support is inverted. Others iterate between improving the cost function $\|y-Ax\|_2$ and enforcing the restricted signal support. The model-based counterparts modify the support identification or enforcement step, in accordance to the support model for the signal of interest.

Model-based convex optimization procedures can be implemented in several ways. Usually the procedures attempt to balance the data fidelity cost $\|y-Ax\|_2$ with a model-based cost $g(x)$—a convex function penalizing deviations from the signal model. For example, in the standard sparsity model used in most compressed sensing applications, the model-based cost is the $l_1$ penalty $g(x)=\|x\|_1$. One approach to optimize such a convex cost is to alternate between a gradient descent improving the data fidelity part of the cost, and a hard or soft thresholding step improving the model-based cost.

SUMMARY OF THE INVENTION

The embodiments of the invention provide a method for sensing depths in a scene using active coherent sensing. The scene, although sparse, exhibits further significant structure, which cannot be exploited using conventional sparse recovery processes.

Therefore, the invention uses a scene model that enforces occlusion constraints to recover a depth map.

The invention provides a variation of the well-known model-based Compressive Sampling Matching Pursuit (CoSaMP) process, which significantly improves reconstruction performance.

More specifically, the method uses an active coherent sensing system to transmit pulses to the scene. The pulses are reflected by reflectors (objects) in the scene. The reflected pulses are received by the system and processed to reconstruct the scene depth. The processing uses a greedy or a convex reconstruction method, which enforces a signal model appropriate for depth sensing.

Specifically, the model stipulates that along every direction away from the sensing system, the recovered signal can only contain one reflector, i.e., only one reflector can be identified. Any object behind the identified reflector is obscured by the identified reflector, and any object in front of the identified reflector would obscure the reflector, and, therefore, the reflector would not be identifiable.

BRIEF DESCRIPTION OF THE DRAWINGS

FIG. 4 is pseudocode for a variation of model-based Compressive Sampling Matching Pursuit (CoSaMP) according to embodiments of the invention;

FIG. 5 is pseudocode for a truncation operator process according to embodiments of the invention.

DETAILED DESCRIPTION OF THE PREFERRED EMBODIMENT

Signal Acquisition Model for Depth Sensing

The embodiments of the invention provide a method for obtaining a depth map of a scene.

Figure 1A:
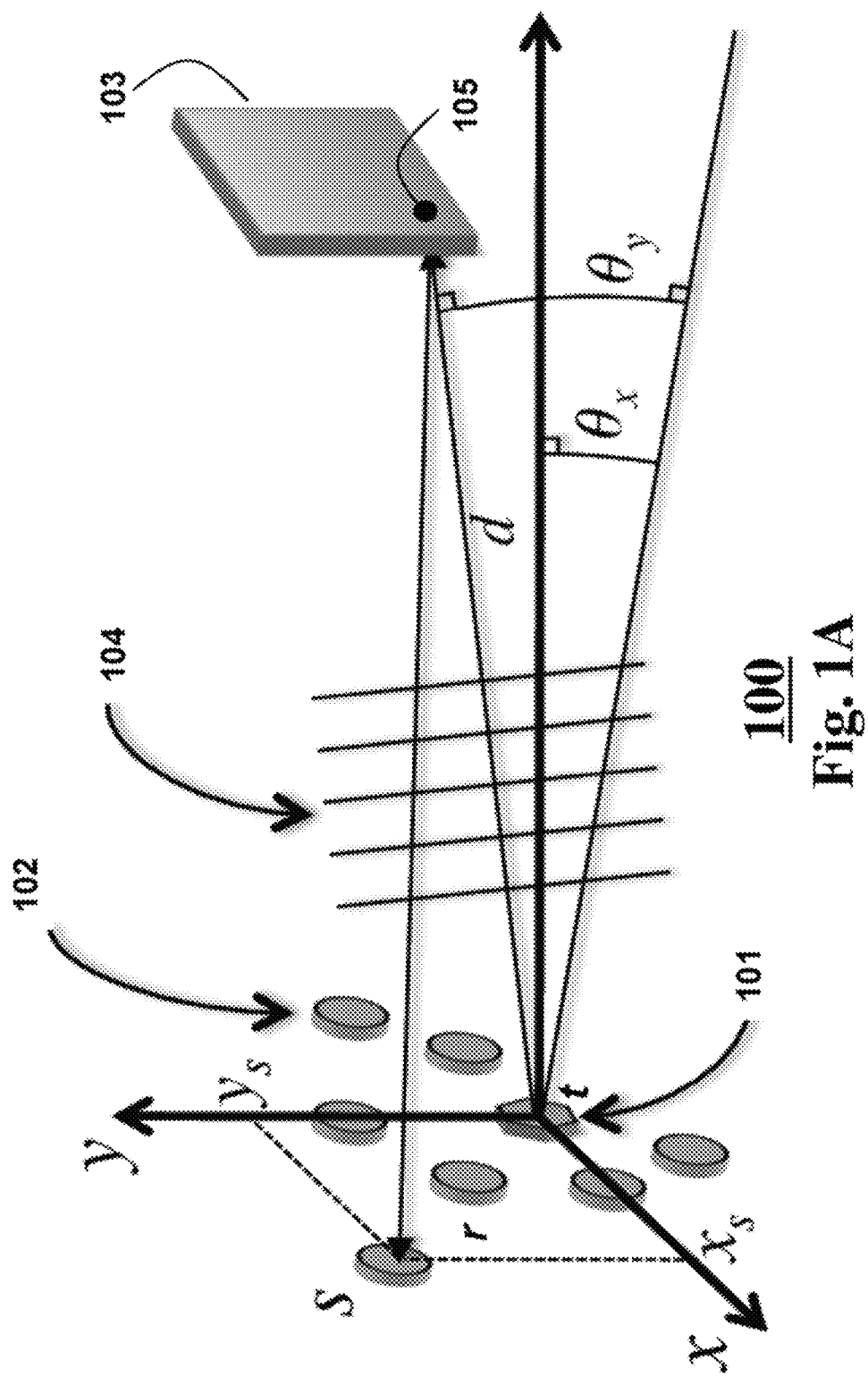
FIG. 1A is a schematic of a scene and a reflector to be depth sensed by multiple receivers according to embodiments of the invention.

As shown in FIG. 1A, the embodiments use an active coherent sensing array. For simplicity, one transmitter 101 and multiple receivers 102 sense reflected pulses from scene including a reflector (object) 103. Multiple transmitters can be easily incorporated, for example by having each transmitter transmit a pulse separately from the others, recording the reflections, and forming an enlarged reconstruction problem. Alternatively, multiple transmitters can transmit simultaneously using different pulses, for example, orthogonal, incoherent, or randomly generated.

To sense a 2- or 3-dimensional scene, the embodiments use a linear or planar array, respectively. The invention determines the depth d or distance from each reflector in the scene to the array. The transmitted signal does not penetrate objects in the scene. Secondary reflections are not considered. In other words, an object in the scene completely hides or obscures everything behind it.

As a special case, the embodiments examine a planar array under a far-field approximation. That is, the reflector 103 in the scene is far enough from the array such that the reflected signals are approximately planar 104 at the receivers 102.

In the far-field approximation, each point n 105 in the scene is described by a distance $d_n$ from the array, and a 2-dimensional angle $\theta$ with respect to a normal of the array plane, denoted $\phi_n = [\theta_{xn} \theta_{yn}]^T$. A transformation $\psi_n = [\sin \theta_{xn} \sin \theta_{yn}]^T$ is defined. For a linear array sensing a 2-dimensional scene, the only modification is that the angle is one dimensional. Henceforth, the angles $\psi_n$ are the orientation coordinates, in contrast to the depth coordinates $d_n$.

The location of each receiver r in the coordinate plane of the array is defined as $v_r = [x_r \ y_r]^T$. Thus, under the far-field approximation, the distance travelled by the signal from the transmitter to scene point n and back to sensor r is equal to $2d_n + x_r \sin \theta_{xn} + y_r \sin \theta_{yn} = 2d_n + v_r^T \psi_n$, and the corresponding delay is equal to $(2d_n + v_r^T \psi_n)/c$. Thus, the receiver can be described by $$Y_r(\omega) = \sum_n x_n e^{-j\omega(2d_n + v_r^T \psi_n)/c} P(\omega), \qquad (4)$$

where the dependence on s in Eqn. (1) is dropped because only one transmitter is used. The linear system in Eqn. (4) is compactly denoted using $$Y(\omega) = A(\omega). \qquad (5)$$

The system is typically broadband.

The frequency space to $\omega_1, \ldots, \omega_F$ is discretized, and the overall system is $$Y = Ax, \ Y = \begin{bmatrix} Y(\omega_1) \\ \vdots \\ Y(\omega_F) \end{bmatrix}, \ A = \begin{bmatrix} A(\omega_1) \\ \vdots \\ A(\omega_F) \end{bmatrix}, \qquad (6)$$

as described above. Henceforth we also refer to A as the propagation matrix.

For implementation purposes, the adjoint of the matrix A is staightforward to determine from the adjoint of $A(\omega)$:

$$A^H Y = \sum_{f=1}^{F} A^H(\omega_f) Y(\omega_f). \qquad (7)$$

In many cases of uniform or other structured arrays, efficient computation of $A(\omega)$, and its adjoint is possible. In these cases, Eqn. (7) is also more efficient than an explicit computation of $A^H$.

If the system uses multiple transmitters transmitting simultaneously, then the overall propagation matrix A can be formed using the principle of sureposition by adding the individual propagation matrices formed as if each transmitter was transmitting separately.

Also, if the system uses multiple transmitters, some transmitting separately and some transmitting simultaneously with other transmitters, the propagation matrix A can be enlarged to include any combination of separate and simultaneous transmissions by stacking the matrices corresponding to each transmission on top of each other.

For example, a system uses three transmitters, each transmitting one specific pulse and having corresponding propagation matrices $A_1$, $A_2$, and $A_3$. If the first transmitter transmits separately, with data recorded in $Y_1$, followed by a simultaneous transmission from transmitters 2 and 3, with data recorder in $Y_2$, followed by simultaneous transmission from transmitters 1 and 2, with data recorded in $Y_3$, then the overall system equation is:

$$Y = Ax, \ Y = \begin{bmatrix} Y_1 \\ Y_2 \\ Y_3 \end{bmatrix}, \ A = \begin{bmatrix} A_1 \\ A_2 + A_3 \\ A_1 + A_2 \end{bmatrix}.$$

Scene Model

Figure 1B:
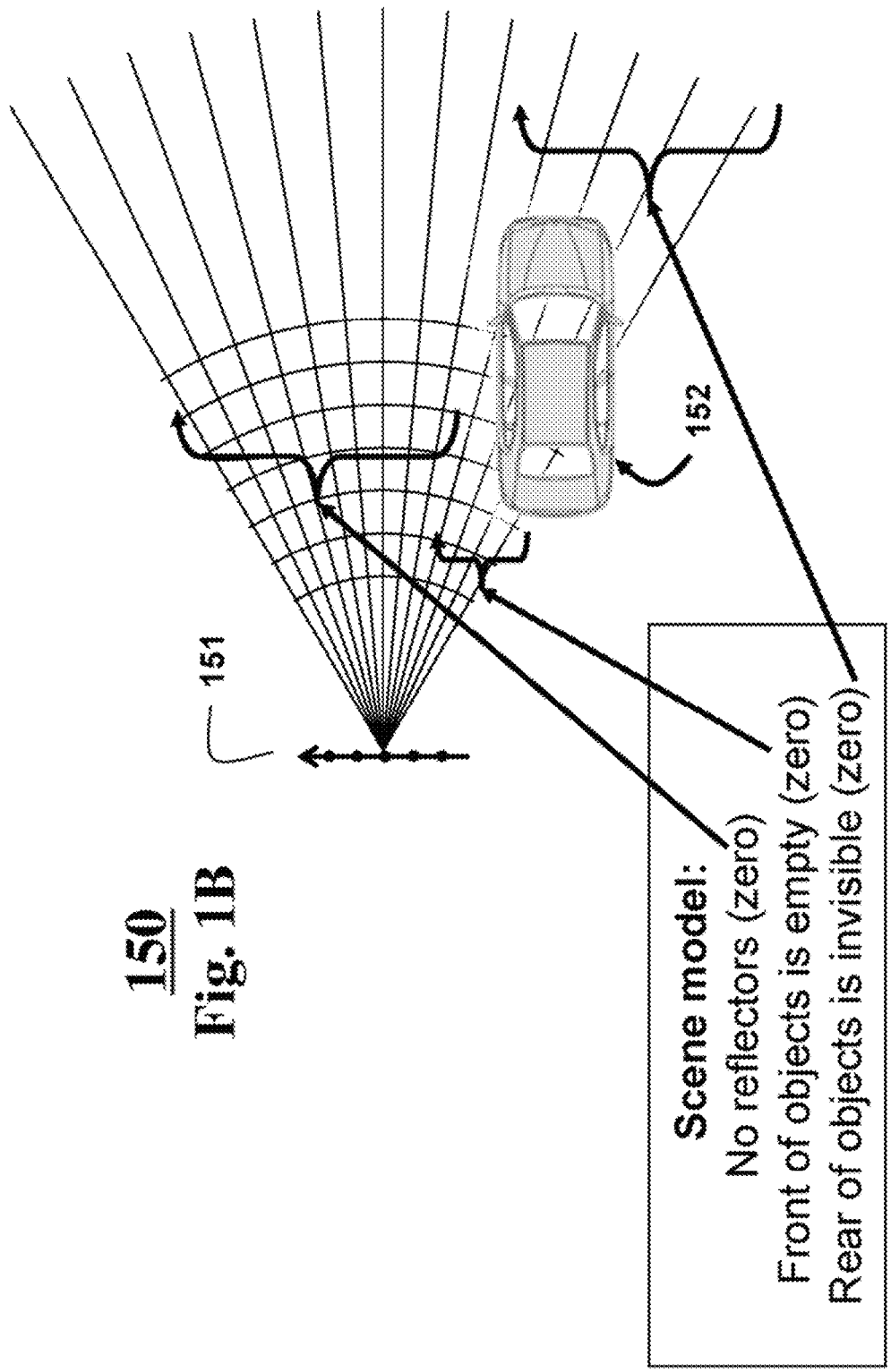
FIG. 1B is a schematic of a scene model with an array of sensors to sense an object according to embodiments of the invention.
Figure 2A:
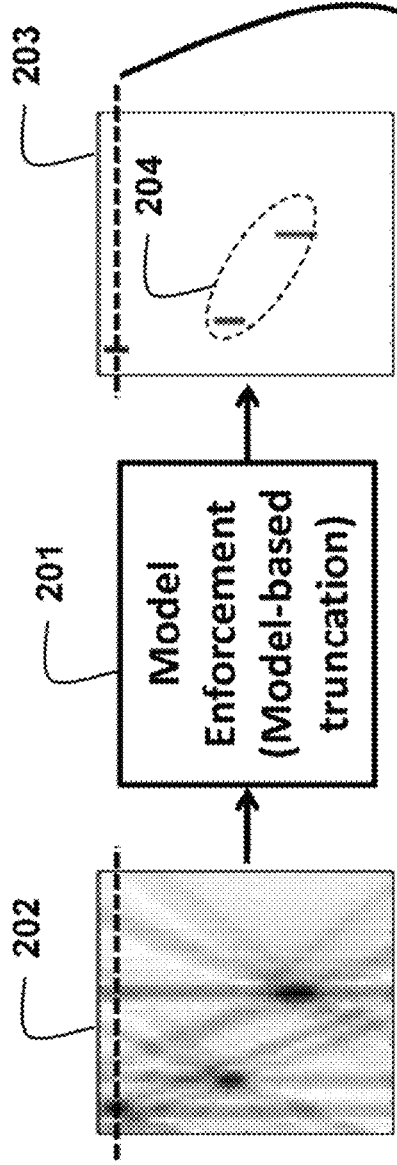
FIG. 2A is a schematic of model enforcement according to embodiments of the invention.

FIGS. 1B and 2A shows a scene model 150 according to embodiments of the invention. The Figures show an array 201 and an object (reflector) 202. If the transmitted pulse is not reflected by any reflectors in the scene along a particular direction, then all the scene points $x_n$ along this direction do not reflect and, therefore, their reflectivity is equal to zero. If a visible reflector exists along a direction, then scene points along this direction in front of the reflector are empty, i.e., zero. Otherwise the reflector would be occluded and would not be visible. Points behind the reflector are also zero because, even if another reflector was there, the signal never reaches the points and, therefore, is not reflected. In addition, we can further enforce that only few of the directions might contain reflectors, instead of being empty.

For example, in a planar array, two points m,n with coordinates $\omega_m = \omega_n$ and $d_m \neq d_n$ cannot both have non-zero reflectivity. In other words, if the coefficient space is partitioned in groups, where all the elements in the group have the same orientation coordinates (i.e., are in the same direction away from the receiver), then each group is 1-sparse. If the depth map itself is not dense in number of objects, then further structure can be imposed, namely that only K of the groups are active, i.e., that there are objects along only K of the orientation directions, where K is a desired sparsity.

This is a union of subspaces model. Assuming the coordinate space is discritized to $N_x \times 4N_y$ orientation points and $N_d$ depth points, the number of subspaces comprising the model is $$\binom{N_x N_y}{K} N_d^K \le \left(\frac{N_x N_y N_d}{K}\right)^K, \quad (8)$$

where $K = N_x N_y$ when the depth map is dense. The upper bound on the number of subspaces on the left hand side of Eqn. (8) is the same as an unrestricted K-sparse scene model. This implies that the upper bound is loose, and that certain guarantees that depend on the number of subspaces cannot be improved using that bound. This, however does not mean that the model is not an improvement over simple sparsity. Enforcing the model significantly improves the results over an unrestricted sparsity model.

Model Enforcement

FIG. 2A shows model enforcement 201 on the acquired signal 202, and the resultant enforced signal 203. Clearly, the depth to the reflectors 204 are better after enforcement.

Figure 2B:
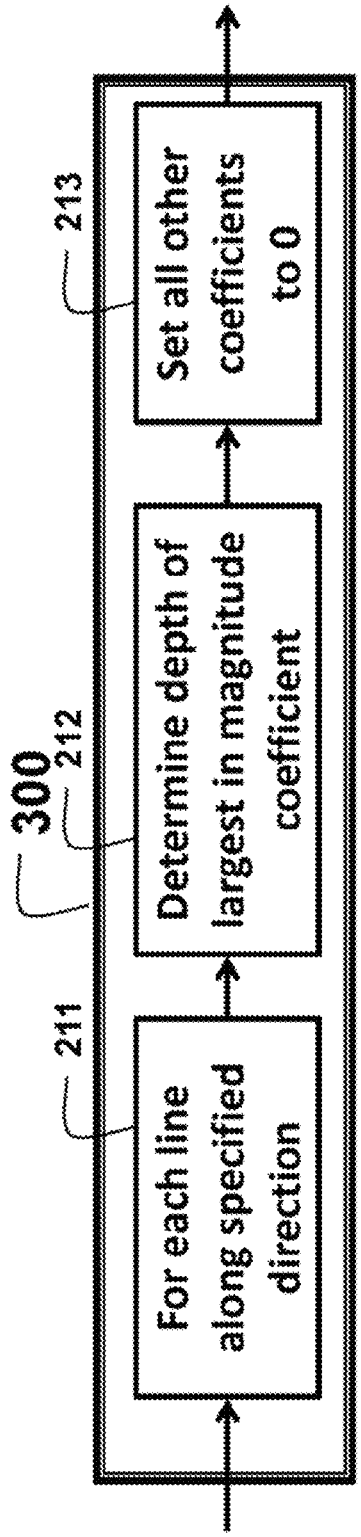
FIG. 2B is a flow diagram of a process for determining largest depths according to embodiments of the invention.

As shown in FIG. 2B for each line along a specified direction 211, the enforcement determines 212, a largest depth in magnitude coefficients, and sets 213 all other coefficients to zero.

Reconstruction Method

Figure 3:
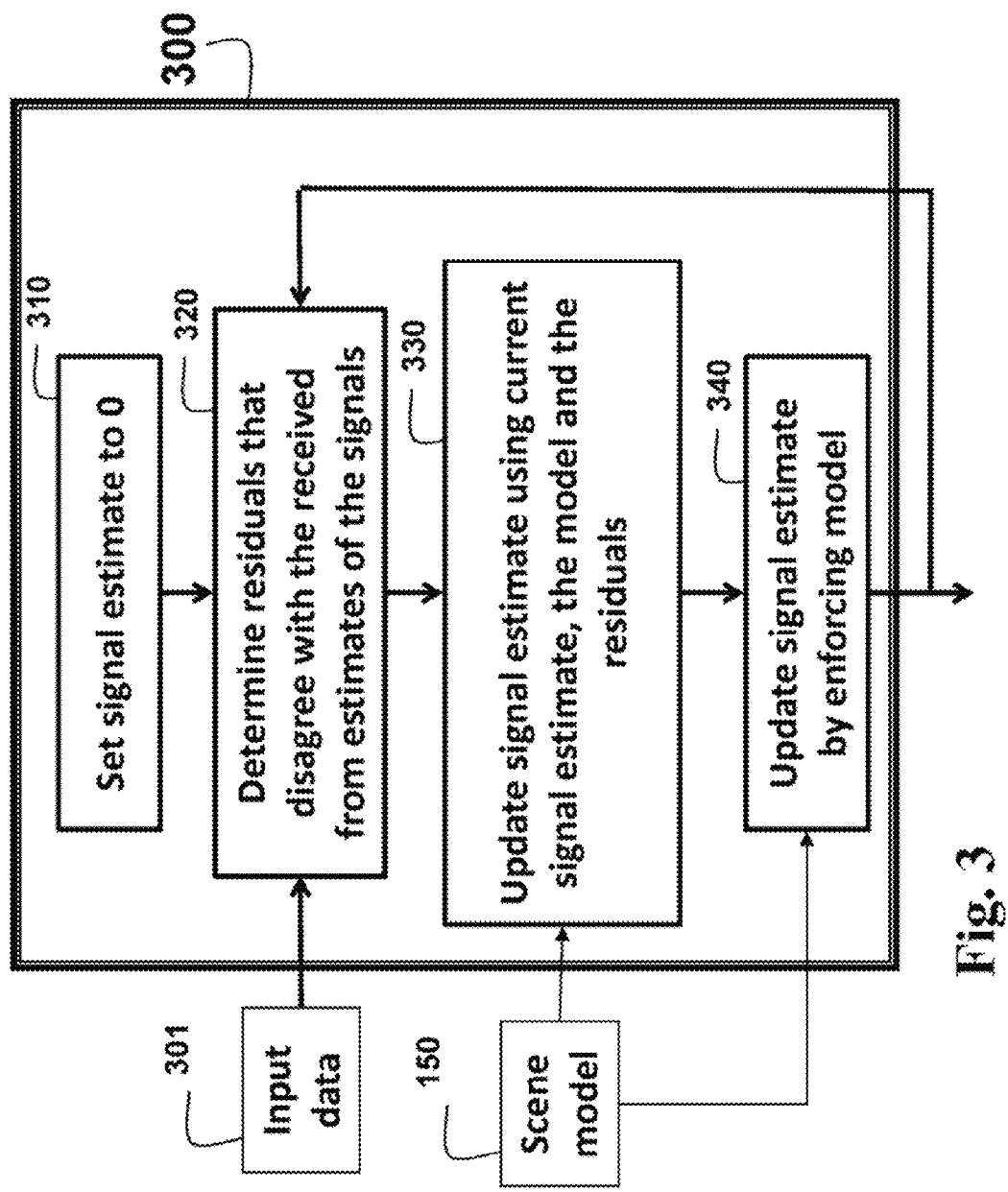
FIG. 3 is a flow diagram of a method for depth sensing according to embodiments of the invention.

FIG. 3 shows the reconstruction method according to embodiments of the invention. The self explanatory pseudo code is shown in FIG. 4. The steps iterate until the estimated signal converges. Radar signal reconstruction is extremely complex, therefore, the steps of the method are performed in a processor 300 connected to a memory and input/output interface as known in the art.

Initially (step 1), the signal estimate is set 310 to zero. Input data 301 is the matrix Y of acquired signals. In step 4, residuals that describe how the input data disagree with the signal estimate are determined 320 from signal estimate and input data (signals), i.e., R=Y−Ax.

Next, 330, the signal estimate is updated using the current signal estimate, the signal model, and the residuals. Depending on the reconstruction procedure, the model might or might not be used in this step.

Next, in step 340, the signal estimate is updated by enforcing the model. The process is repeated from 320 until convergence.

FIG. 4 shows the pseudocode for one possible implementation of the steps in FIG. 3—specifically, a variation of model-based CoSaMP according to embodiments of the invention.

Step 1 in FIG. 4 corresponds to 310, step 4 to 320, steps 5, 6, 7 and 8 to 330, steps 9 and 10 to 340, and steps 2, 3 and 10 to the iteration (repeating) until convergence.

Updating the signal estimate is performed by step 5 computing the proxy (gradient of signal update)

$$p^l = \sum_{\omega=\omega_1}^{\omega_F} A^H(\omega) R(\omega),$$

and then in step 6, the support candidates $$T^l = \mathrm{supp}(\mathrm{trunc}(p^l, K)) \cup \mathrm{supp}(\hat{x}^{l-1})$$

are identified.

A line search is used in step 7 to determine how far to follow the gradient computed in step 5 to improve the estimate. Step 8 improves the signal estimate as determined by step 7 and forms a temporary signal estimate. This signal is truncated according to the model in steps 9 and 10.

The differences in this variation compared to standard CoSaMP and standard model-based CoSaMP are as follows. The first difference is the use of line-search to reduce the cost in step 7 instead of a full least-squares minimization using an pseudoinverse as in the prior art. This makes the process significantly more efficient if the propagation matrix $A(\omega)$ is only available in a functional form, and not explicitly. The modified process requires the applications of $A(\omega)$, and its adjoint, which is usually easily computable in array applications.

The second difference is the modification of the support identification steps 6 and 9, according to the requirements of the model. Specifically, the pseudocode for a truncation operation trunc(x) is shown in FIGS. 2B and 5.

The truncation first selects the single largest depth magnitude coefficients in each orientation, and then selects the K largest of those. Thus, only one coefficient in each orientation is ever selected. This enforces the occlusion constraint stated above.

Effect of the Invention

The invention uses coherent sensing technology for depth sensing applications. For such applications, sparsity and scene models play a key role in improving the system performance. The model and corresponding method are explicitly designed to take into account the particular structure of depth-maps.

Figure 6:
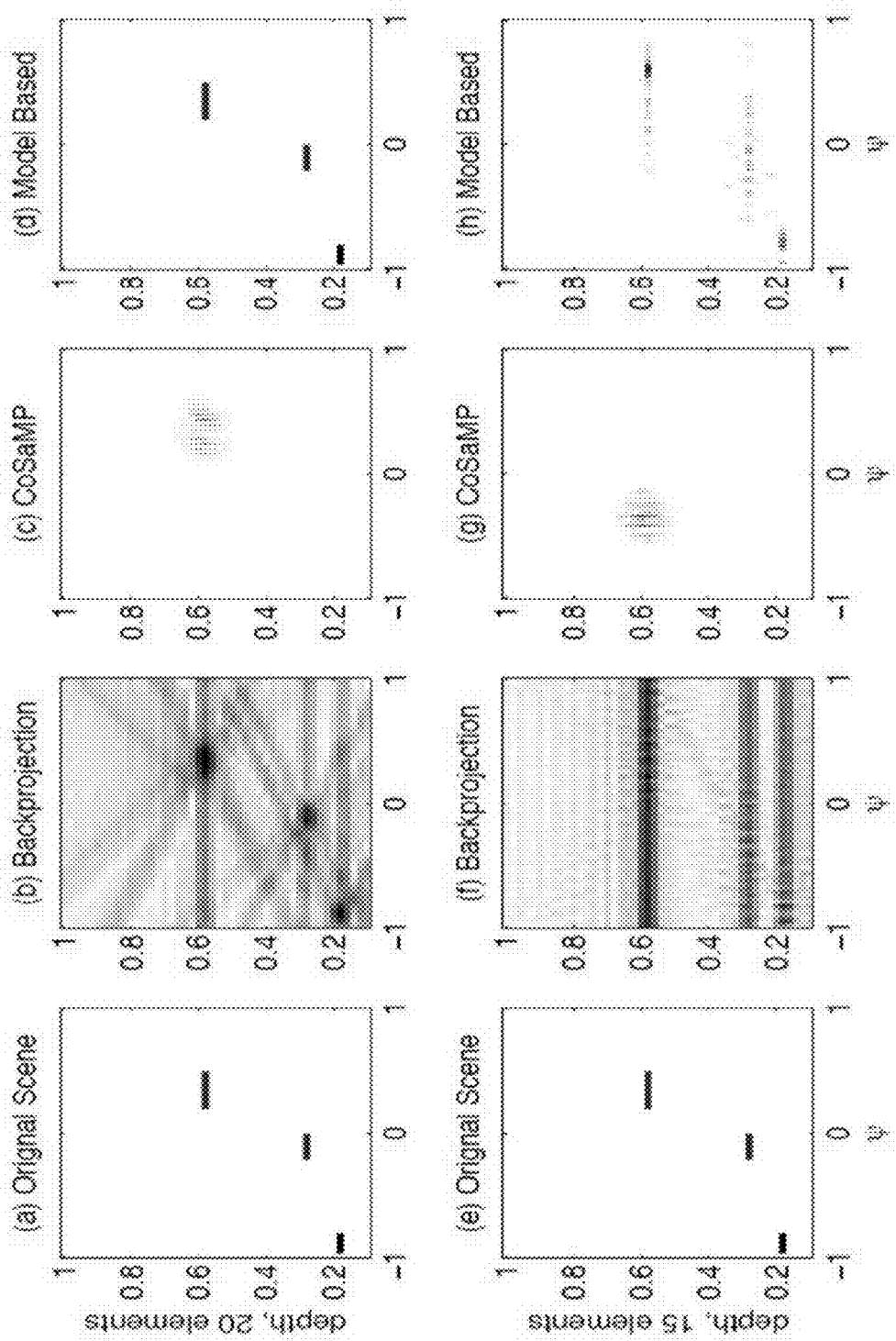
FIG. 6 is a block schematic comparing conventional and model-based reconstruction.

FIG. 6 compares prior art backprojection and prior art. CoSaMP with model-based reconstion according to embodiments of the invention. From left to right the Figure shows the original scene, backprojection reconstruction, conventiona sparsity-based reconstruction using CoSaMP, and model-based reconstruction using model-based CoSaMP according to embodiments of the invention. The top row shows results for a 21-element array, and the bottom row results for a 15-element array. It is clear that the model-based approach gives better results.

The comparison is simulated with a mm Wave system operating at a 3 GHz frequency bandwidth, centered at 76.5 GHz. The angle space $\psi$ is discretized at a resolution of 0.01 (in the dimensions of the sine, of the angle) for 201 total gridpoints. The scene has 1 m maximum depth with 2 cm grid resolution.

The top row shows a typical failure mode of conventional sparsity-based compressive sensing that is corrected with the model-based approach. As can be seen from the backprojection results, there is significant ambiguity around the reflectors, due to the relatively high coherence of nearby pixels. These can confuse conventional sparsity-based CS reconstruction. For example, the CoSaMP only detects one of the reflectors, and the region around it.

Even by reducing the desired sparsity of the reconstructed signal, performance does not improve. The model-based approach resolves these ambiguities and accurately reconstruct the signal.

Even in cases of significant ambiguities, as the example shown in the bottom row, the model significantly improves reconstruction performance. Specifically, the reduced number of array elements increases array ambiguities, as shown by the significant horizontal blur of the backprojection reconstruction. As expected, simple sparse reconstruction fails to recover the scene. The model-based approach significantly improves the identification of the support of the depth-map. Subsequent processing, such as total-variation based smoothing, can also be used to further smooth the produced depth map.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A system, comprising:
a transmitter, wherein the transmitter is a pulse radar transmitter;
multiple receivers, wherein the multiple receivers are pulse radar receivers of reflected signals corresponding to signals transmitted by the transmitter, and wherein the receivers are arranged in an array;
a processor, wherein the processor is connected to the transmitter, the multiple receivers and a memory, wherein the processor reconstructs a scene as a depth map using the reflected signals from reflectors in the scene, and wherein the processing enforces a model in which a reflectivity of the scene in front and behind at least one or more reflectors is equal to zero, wherein the processor forms an initial signal estimate that agrees with the model, determines residuals describing how the reflected signals disagree with the signal estimate, and updates the signal estimate using a current signal estimate according to the model and the residuals.

2. The system of claim 1, wherein the transmitter and multiple receivers are coherent.

3. The system of claim 1, wherein the transmitter uses wide band pulses.

4. The system of claim 1, wherein the array is linear under a far-field approximation.

5. The system of claim 1, wherein the array is planar under a far-field approximation.

6. The system of claim 1, wherein the scene is discretized into points.

7. The system of claim 4, wherein each point n in the scene is described by a distance dn, and a 1-dimensional angle $\theta$ with respect to a normal plane to an axis of the array.

8. The system of claim 5, wherein each point n in the scene is described by a distance dn, and a 2-dimensional angle $\theta$ with respect to a normal to a plane of the array.

9. The system of claim 6, wherein a coordinate space is discretized to Nx×Ny orientation points and Nd depth points, and the model is $$\binom{N_x N_y}{K} N_d^K \leq \left(\frac{N_x N_y N_d}{K}\right)^K,$$

where K is a desired sparsity.

10. The system of claim 1, wherein the scene is sparse.

11. The system of claim 3, wherein the pulses are generated orthogonal.

12. The system of claim 3, wherein the pulses are generated randomly.

13. The system of claim 3, wherein the pulses are generated to be incoherent.

14. The system of claim 5, wherein two points m, n with coordinates $\psi_m \psi_n$ and $d_m \neq d_n$, do not both have non-zero reflectivity.

* * * * *